(12) United States Patent
Morley et al.

(10) Patent No.: US 11,086,278 B2
(45) Date of Patent: Aug. 10, 2021

(54) ADAPTIVE SYSTEM MONITORING USING INCREMENTAL REGRESSION MODEL DEVELOPMENT

(71) Applicant: Inventus Holdings, LLC, Juno Beach, FL (US)

(72) Inventors: James U. Morley, Port Saint Lucie, FL (US); Dennis A. Moon, Grand Rapids, MN (US); Lowell Crosby Savage, III, Woodbury, MN (US); Sriharsha Veeramachaneni, Minneapolis, MN (US); Raja D. Doake, Minneapolis, MN (US); Richard Mack Argentieri, Inver Grove Heights, MN (US)

(73) Assignee: Inventus Holdings, LLC, Juno Beach, FL (US)

( * ) Notice: Subject to any disclaimer, the term of this patent is extended or adjusted under 35 U.S.C. 154(b) by 0 days.

(21) Appl. No.: 16/555,310

(22) Filed: Aug. 29, 2019

(65) Prior Publication Data

US 2021/0063975 A1 Mar. 4, 2021

(51) Int. Cl.
*G05B 13/04* (2006.01)
*G05B 23/02* (2006.01)
(Continued)

(52) U.S. Cl.
CPC ......... *G05B 13/048* (2013.01); *G05B 19/048* (2013.01); *G05B 23/0254* (2013.01); *H02J 3/383* (2013.01)

(58) Field of Classification Search
CPC .......................... G05B 13/048; G05B 23/0254; G05B 19/048; H02J 3/383
See application file for complete search history.

(56) References Cited

U.S. PATENT DOCUMENTS 8,289,183 B1 10/2012 Foss
8,476,870 B2 7/2013 Labrunie et al.
(Continued)

FOREIGN PATENT DOCUMENTS

WO 2011104931 9/2011

OTHER PUBLICATIONS

Bing, James M., Application Note: Predicting and monitoring PV energy production, European Copper Institute, Jan. 2015, Report Cu0207, 24 Pages.
(Continued)

*Primary Examiner* — Charles R Kasenge
(74) *Attorney, Agent, or Firm* — Fleit Intellectual Property Law; Jeffrey N. Giunta

(57) ABSTRACT

Systems and methods for monitoring an operational system. A data set with output power values and associated environmental data values for an electrical generation system are accumulated. Statistical relationships are determined for output power values and environmental data values. Outlying data is determined based on the statistical relationships and are removed from the data set to create selected data. A regression model is developed from the selected data to map predicted output power values to values of environmental data. Data with present output power values and present associated environmental data for the electrical generation system are later received. Predicted output power values are predicted by the regression model for the present associated environmental data. An output power discrepancy is identified by comparing the predicted output power to the present output power. A notification of an anomaly is provided based on identification of the output power discrepancy.

27 Claims, 6 Drawing Sheets

(51) Int. Cl.
*H02J 3/38* (2006.01)
*G05B 19/048* (2006.01)

(56) References Cited

U.S. PATENT DOCUMENTS

| | | |
|---|---|---|
| 8,682,585 B1 | 3/2014 | Hoff |
| 8,892,411 B2 | 11/2014 | Tsuruta et al. |
| 9,053,439 B2 | 6/2015 | Mawah et al. |
| 9,446,043 B2 | 9/2016 | Porter et al. |
| 9,590,559 B2 | 3/2017 | Jarnason et al. |
| 9,621,104 B2 | 4/2017 | Lynass et al. |
| 9,660,574 B2 | 5/2017 | Caine |
| 9,660,576 B2 | 5/2017 | Jungerman |
| 9,830,301 B1 | 11/2017 | Batten et al. |
| 9,939,485 B1 | 4/2018 | Johnson et al. |
| 2011/0066401 A1 | 3/2011 | Yang et al. |
| 2011/0184583 A1 | 7/2011 | El-barbari et al. |
| 2012/0310427 A1 | 12/2012 | Williams et al. |
| 2014/0136178 A1* | 5/2014 | Meagher ............... G06N 5/047 703/18 |
| 2014/0278332 A1 | 9/2014 | Grammatikakis et al. |
| 2015/0012258 A1 | 1/2015 | Caine |
| 2015/0142347 A1* | 5/2015 | Mohan ............... G01W 1/10 702/60 |
| 2016/0181974 A1 | 6/2016 | Groene et al. |
| 2016/0233830 A1 | 8/2016 | Kouno et al. |
| 2017/0102675 A1 | 4/2017 | Drees |
| 2017/0228653 A1* | 8/2017 | Meagher ............... G06N 20/00 |
| 2017/0338659 A1 | 11/2017 | Bhowmik et al. |
| 2018/0373827 A1* | 12/2018 | Meagher ............... G06N 5/045 |

OTHER PUBLICATIONS

C. Chang, J. Zhu and H. Tsai, abstract of "Model-based performance diagnosis for PV systems," Proceedings of SICE Annual Conference 2010, Taipei Aug. 2010.

Stein, Joshua S., et al., PV Performance Modeling Methods and Practices, 4th PV Performance Modeling collaborative Workshop, Mar. 2017, Report IEA-PVPS T13-06:2017, 98 pages.

* cited by examiner

ADAPTIVE SYSTEM MONITORING USING INCREMENTAL REGRESSION MODEL DEVELOPMENT

FIELD OF THE DISCLOSURE

The present disclosure generally relates to monitoring the operation of electrical generation systems, and more particularly to monitoring and evaluating the performance of electrical generation facilities.

BACKGROUND

Mathematical models are able to be used to model the operation of systems that are in service. Such systems are referred to herein as "operating systems." These mathematical models, such as regression or other suitable mathematical models, are able to be used to assist in the monitoring and evaluation of operational systems in order to detect operating anomalies that may indicate potential issues or maintenance requirements. In an example, a regression model includes one or more mathematical equations that relate one or more monitored values associated with a system to other values of the system. In an example, a relationship exists between the electrical power output of an inverter at a PV (photovoltaic) solar generation site and one or more operational or environmental conditions such as the present level of plane-of-array (POA) irradiance (e.g., the solar energy received in the plane of the PV array from the sun), the back of panel (BOP) temperature of the solar panels, other quantities, or combinations of these.

In an example, creating and maintaining a regression model includes collecting environmental data values concerning measured POA irradiance, measured BOP temperature, potentially other environmental parameters, and the electrical power output of each inverter at a solar site while the solar site operates for an amount of time that allows the operations to experience a sufficiently wide range of ambient and other operating conditions. A mathematical regression model for this relationship is then created by determining a mathematical relationship between or among the observed quantities. In a simplified example, a model to predict the electrical power output of each inverter at a solar PV generation site as a function of POA irradiance and BOP temperature operates by receiving a particular BOP temperature and POA irradiance value as an input to the model and produces an expected or predicted electrical power output value for each inverter at the solar site.

One use for a mathematical model is monitoring operating systems to identify possible operating anomalies in the system by comparing actual system performance to predicted performance given the system's environment and inputs. In an example, regression based anomaly detection for an operational system uses a regression model that was developed by incorporating measurements covering a sufficient range of measured values while the system being observed is operating normally.

Manually selected "good" datasets are sometimes used to create a mathematical model for a system. The manual selection of a suitably "good" dataset can be time consuming for a highly skilled expert who is needed to properly identify desired data values and exclude potentially anomalous data. For example, a "good" dataset has to be identified from collected measurement data and has to include a sufficiently wide range of input values and also has to include corresponding measured values that represent proper operation that have no anomalies themselves.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which.

DETAILED DESCRIPTION

Figure 1:
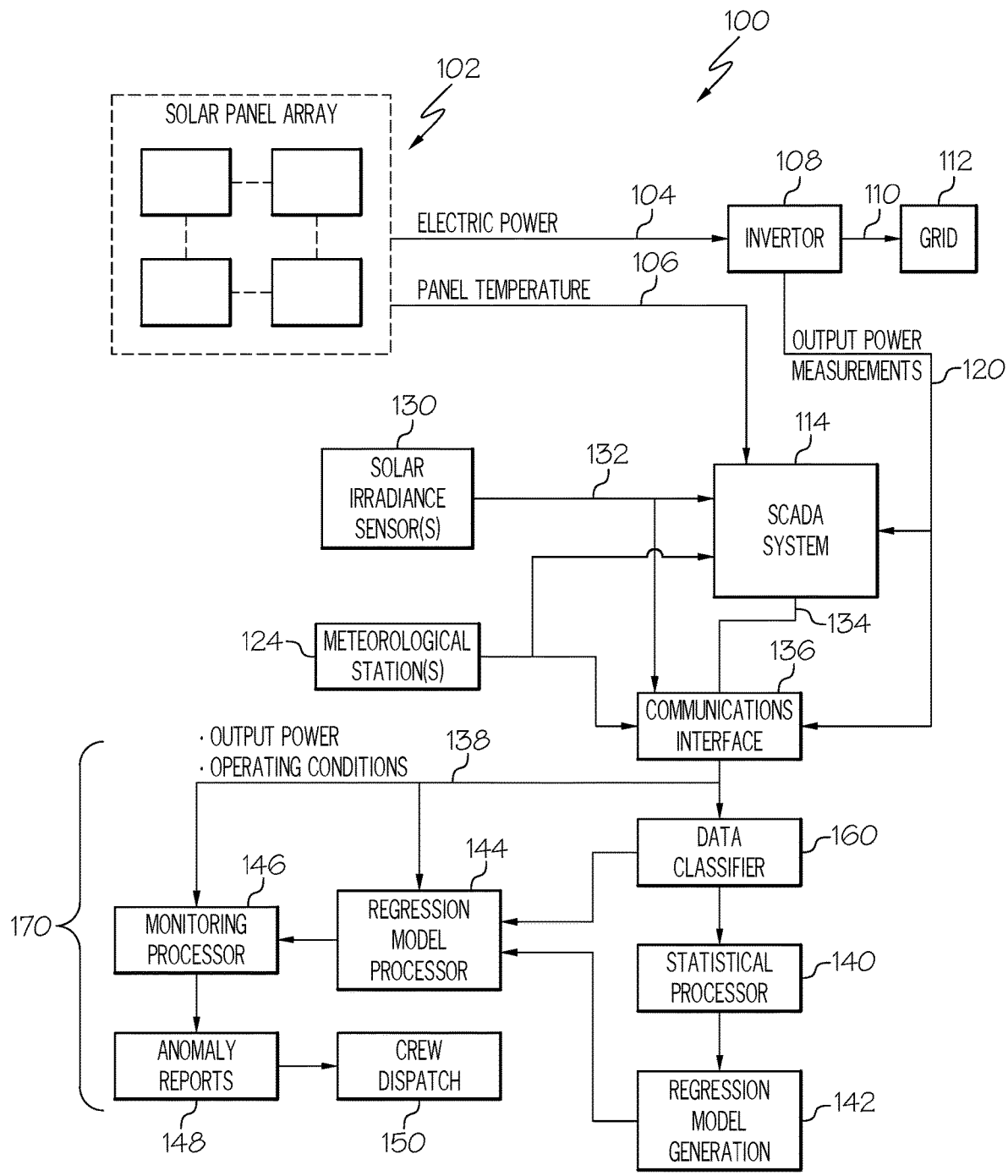
FIG. 1 illustrates an example PV electric generation and facility monitoring system, according to an example.

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the disclosed subject matter in virtually any appropriately detailed structure and function. Further, the terms and phrases used herein are not intended to be limiting, but rather, to provide an understandable description.

The terms "a" or "an", as used herein, are defined as one or more than one. The term plurality, as used herein, is defined as two or more than two. The term another, as used herein, is defined as at least a second or more. The terms "including" and "having," as used herein, are defined as comprising (i.e., open language). The term "coupled," as used herein, is defined as "connected," although not necessarily directly, and not necessarily mechanically. The term "configured to" describes hardware, software or a combination of hardware and software that is adapted to, set up, arranged, built, composed, constructed, designed or that has any combination of these characteristics to carry out a given function. The term "adapted to" describes hardware, software or a combination of hardware and software that is capable of, able to accommodate, to make, or that is suitable to carry out a given function.

The below described systems and methods operate to monitor the operations of solar energy driven electrical generation facilities, such as PV electrical generation sites, to identify possible anomalies or other problems associated with the operation of that site. In some examples, mathematical models such as regression models are created and maintained to model the operation of one or more PV electrical generation sites. In the following discussion, processes to either: create one or more regression models; maintain one or more regression models; or both, are referred to as processes to develop a regression model. In some examples, regression models are created and maintained by collecting and storing data that is measured during a time duration when the PV electrical generation site is operating normally. The measured data is then processed to derive a mathematical model that relates measured environmental data to measured output power data. Although the below described examples describe monitoring of a photovoltaic electrical generation site, it is to be readily understood that the below described systems and methods are readily adapted to systems and methods that develop mathematical models of any type of operating system, such as any type of electrical generation system, where those mathematical models are used to monitor those systems.

The derived regression models are used to predict the electrical power output that is expected to be produced by each inverter at a particular PV electrical generation site based on various environmental or operational factors such as the present level of POA irradiance, BOP temperature, other quantities, or combinations of these. Differences between the inverter's electrical power output value predicted by the regression model given the conditions present at the site facilitates and the inverter's actual electrical output power during a monitoring time duration that is subsequent to the time duration during which data to create or maintain the model were measured are used to support recognizing and identifying potential operational issues with equipment in those facilities.

In an example, as data is collected over a time duration to create or maintain a regression model, care is taken to ensure that the collected data is representative of normal or optimal conditions. Conditions that would distort the normal operating relationship between the inverter's output electrical power, POA irradiance and BOP temperature, such as mix of sun-and-cloud conditions, snow cover, curtailment, damage to equipment or other inverter faults are excluded from the data that is used to create or maintain a regression model that is used to monitor the operations of each inverter at a PV electrical generation site.

In some examples, the clear sky POA irradiance, present elevation and azimuth of the sun is included as in input to the regression model and development of the regression model includes predicting the electrical power output for each inverter at a PV electrical generation site based on the clear sky POA irradiance, elevation and azimuth angles of the sun. In some examples, the ratio of POA irradiance to the clear sky POA irradiance helps to define the sky conditions as either overcast of clear. This information informs the regression model and helps it to accurately predict the inverter power under overcast and clear sky conditions.

The regression model used to predict the electrical power output for each inverter at a particular PV electrical generation site is developed in an example using data that is representative of normal or optimal operations for the inverter given particular observed conditions. In an example, such data is obtained by collecting a large amount of data for each inverter during operations and only retaining data that is considered normal in terms of inverter performance and does not occur during periods when irregular conditions exist. For example, data collected during periods that are likely to consist of a mix of sun-and-cloud sky conditions or when snow is on the PV panels is not retained for use in developing a regression model.

In some examples, data that is considered to be normal in terms of inverter performance includes data that is very close to an average, mean, other statistically expected value, or combinations of these, of that collected data for a particular set of operating conditions. During creation of the regression model, the standard deviation of the inverter power dataset is calculated and stored for later use. In an example, given suitable PV site conditions, the regression model is constructed with the assistance of a Gaussian filter methodology that utilizes the standard deviation as a factor to exclude outlier data in the collected data used to develop the regression model.

In an example, the collected data used to develop a regression model is very tightly filtered such that data points that are not within, for example, a particular multiple of standard deviation of the collected data (i.e. within specific data bins) are filtered from, i.e., excluded from, the collected data to create a selected data set that is used to create or maintain a regression model for the site. In an example the particular multiple of standard deviation is selected to be between 2.0 and 2.5, such that data that is farther than 2.0*Standard Deviation or 2.5*Standard Deviation is removed from the collected data before using the data to create or maintain a regression model. Such filtering of the collected data in an example excludes data that represents abnormal operations of the site and results in a regression model that more accurately reflects normal, non-degraded operations. In some examples, data is collected during operations of one or more PV solar generation sites and a selected set of data is created by filtering outlying data from the collected data.

In some examples, selected data is created by processing the collected data to remove various types of data that are likely to indicate non-standard, anomalous, or abnormal operations at each inverter. In an example of an inverter at a PV solar generation site, in addition to removing data as is discussed above, other data that can be removed to create the selected data set includes data that varies spatially by more than a threshold or temporally faster that a threshold. With respect to spatial variation, such data may indicate that the data is collected during periods of varying cloud cover (e.g., partial cloud shading of the PV array such as occurs during a mix of sun and cloud conditions) over the PV solar generation site. With respect to temporal variation, varying data may indicate that the data is collected during periods of varying cloud cover (i.e. partial cloud shading of PV array such as during a mix of sun and cloud conditions) over the PV solar generation site. Such varying cloud cover causes an increase in electrical power output variability across the site when clouds reduce sunlight from reaching a part or all of the PV panels connected to one inverter but may not reduce sunlight from reaching the PV panels at another inverter located in a different part of the site. For large or spatially distributed sites, variable cloud cover in an example is also able to shade a POA irradiance sensor while not shading the PV panels connected to a specific inverter (or vice versa). When the solar irradiance sensor is obscured by clouds but an appreciable number of solar panels are not obscured, the electrical output of the inverter will be higher than would be expected based on the POA irradiance level measured by the shaded sensor. Incorporating such a set of measurements in the development of a regression model distorts the POA irradiance to inverter power output relationship and hence are excluded from data used to train the regression model in some examples. In an example, varying cloud cover (e.g., partial cloud shading of PV array or mix of sun and cloud conditions) is identified based on the spatial and temporal varying character of the measured POA irradiance and inverter output power.

In some examples, measurements of POA irradiance and/or inverter electrical output power that vary over relatively short time durations, such as minutes, are removed from the selected data that is used to create or maintain regression models because they are potentially caused by varying cloud cover or other non-standard conditions. In some examples, monitoring the operations of an operating system, such as by comparing measured output values to output values predicted by a regression model, also exclude such time varying data since varying cloud cover or other such sources are not abnormalities that require investigation by service personnel or other investigations or remedial measures.

In an example, data collected during operations of a PV solar generation site are analyzed and divided into different categories. For example, outlying measured electrical output values may be categorized as reduced values due to environmental conditions such as snow cover over solar panels, variable cloud cover (e.g. partial cloud shading of PV array such as occurs with a mix of sun and cloud conditions), inverter faults, curtailment, other categories, or combinations of these. Other information, such as weather data indicating snow fall, cloudiness in the area of the PV solar generation site, other information, or combinations of these, are able to be integrated into the analysis of collected data to support such categorizations.

The regression models created and maintained by the below described methods and systems in an example are based on very tightly filtered and otherwise selected data to improve the accuracy of inverter's predicted electrical power output as a function of environmental and operational data. The improved accuracy of the regression model developed by the below described systems and methods allows more accurate identification of possible operational anomalies of the site.

In general, there are a variety of causes that potentially result in reducing the electrical output power produced by an inverter at a PV electrical generation site relative to what would be expected based on the received POA irradiance and BOP temperature at the site. An inverter's output power is able to be reduced due to unintended causes or due to intended, usually operational reasons. Intended reasons for reduced electrical output power include intentional site output power curtailment for various reasons such as distribution network operational considerations, other intentional reductions in power, or combinations of these. Examples of unintended causes include inverter faults, snow cover or dirt buildup on some or all of the panels, vegetation growth that obscures at least some of the solar panels, electrical issues such as circuit faults, blown fuses or switchgear malfunctions, damage to the solar panels caused by various events such as weather or natural disturbances, incorrect tracking of panels to the sun in facilities with tracking panels, other causes, or combinations of these. In an example, the regression model based inverter monitoring system identifies power output reductions that are due to unintended causes, and therefore not expected, in order to support identifying and reporting potential problems.

In some examples, the below systems and methods receive at least some information from one or more Supervisory Control and Data Acquisition (SCADA) systems that are located at the PV electrical generation site to generally support operations. In some examples, the power output of an electrical generation site is reported to the SCADA system by a measurement device that measures output power delivered to a location that is near an interconnection point between the PV electrical generation site and a connection to an electrical grid. In such a configuration, the reported electrical output power of the PV electrical generation site output may be affected by intentional power reductions that are not related to parameters such as received POA irradiance or BOP temperature. In some examples, measurements made during periods of intentional reduction in inverter output power are excluded from use in creating or maintaining a regression model for the affected inverter(s). In some examples, monitoring the operational performance for all inverters at a PV site uses special processing of received target/set-point values of a desired electrical output for the site, such as external output curtailments that were applied to the site. In an example, such received values are discarded from further processing with regards to creating a regression model or specially categorized when monitoring for anomalies with a regression model.

In some examples, data collected by SCADA systems or other monitoring equipment within a PV electrical generation site report their measurements to a central processing location. In some of these examples, the data from inverters, meteorological stations and in array POA irradiance and BOP temperature sensors is processed to identify the expected performance of each inverter and associated PV components and a more refined regression model is able to be developed based on the data collected from multiple sensors within the PV site. In an example, measured data is received and accumulated from a number of operating POA irradiance sensors, BOP sensors and meteorological stations within the site and are used to identify variable cloud conditions (e.g. partial shading) and when snow is covering the PV panels in order to create and maintain regression models for a particular PV electrical generation site. In some examples, data from multiple PV electrical generation sites, which may or may not have similar architectures, is assembled and used to create or maintain regression models for a particular PV electrical generation site.

In an example, data from the SCADA system at a particular PV electrical generation site is able to support filtering some of the measured data to properly classify (and remove for purposes of generating the regression model) energy production associated with certain sources of power loss such as site curtailment or reduced availability. Data collected during periods of curtailment are able to be identified in a filtering step by, for example, curtailment tags that are inserted into the data produced by the SCADA system or by observing other operating characteristics of the site that are indicated within the data produced by the SCADA system. Power loss due to availability occurs where one or more inverters at a PV electrical generation site is in a faulted state as defined by the SCADA system such as when the inverter(s) are producing no power. Availability loss is not a measurement of Equivalent Forced Outage Rates (EFOR) but rather includes the potential energy lost when an inverter(s) is in a faulted state where no power is being produced.

Another source of power generation loss is referred to as subcurve and includes site component performance-related losses that cannot be classified as either curtailments or availability. Subcurve loss may be defined as the lost power/energy that occurs when a given inverter is outputting power below its normal operating condition. These losses are not necessarily caused by impaired inverter performance, but include performance problems with the PV array, PV tracking system, DC electrical wiring or any other balance of system component within the PV site. This data may be made up of points that reflect inverters that are operating in a non-normal state but still producing power, as opposed to availability which is data from faulted inverters where no power is being produced. Subcurve, thus, includes sources of power generation losses, as measured at the inverter AC outputs, that the SCADA system did not identify and tag as attributed to a faulted or curtailed state.

FIG. 1 illustrates an example PV electric generation and facility monitoring system 100, according to an example. The example electric generation and facility monitoring system 100 includes a solar panel array 102 that is an example of solar panels that includes a number of panels that each receive solar energy and produce DC electrical power 104. The DC electrical power 104 produced by the solar panel array 102 is provided to an inverter 108 that provides AC electrical power to a power grid 112 through a site interconnect 110. The solar panel array 102 in some examples is generally distributed over an area.

The example PV electric generation and facility monitoring system 100 includes a Supervisory Control and Data Acquisition (SCADA) system 114 that performs control and monitoring of components located at the example PV electric generation and facility monitoring system 100. The SCADA system 114 receives data from various sensors within the example PV electric generation and facility monitoring system 100 to support site operations and monitoring, assist in identifying anomalous operations, support other functions, or combinations of these.

In some examples, the SCADA system 114 is able to receive commands to control components within the example PV electric generation and facility monitoring system 100. In an example, the SCADA system 114 either monitors for or commands a curtailment of the example PV electric generation and facility monitoring system 100 via the PV inverters 108 and is able to mark data collected during curtailments to indicate that the values of that collected data may be affected by the curtailment. Although the illustrated example depicts a centralized SCADA system 114, in further examples, the components of the example PV electric generation and facility monitoring system 100 are able to be monitored and controlled, and have various operational values and the site's output power measured and reported by any suitable device, combination of devices or equipment, or combinations of these.

In the illustrated example, the SCADA system 114 receives output power measurements 120 that are provided by provided by all inverters and also from an electrical power meter at or near the site interconnect 110 that is at the point of interconnection with the electric power distribution grid 112. These output power measurements 120 indicate the amount of electrical power produced by the example PV electric generation and facility monitoring system 100. In an example, the output power measurements 120 are measured and produced by the inverter 108 and the meter at the point of interconnection with the electric power distribution grid 112. In further examples, the output power measurements 120 are able to be made by any suitable device. In some examples, electrical power measurements are able to be made and received that reflect electrical power being delivered at any suitable point in the example PV electric generation and facility monitoring system 100.

In this example, one or more panels in the solar panel array 102 are equipped with a BOP temperature sensor that measures the temperature of its panel. The temperature sensors on each panel in this example report measured BOP temperatures 106 to the SCADA system 114 and are used for constructing the regression model and for identifying performance problems in the PV electric generation and facility monitoring system 100. The measured BOP temperature 106 in an example is a measurement that can be used to determine an amount of electrical power the solar PV array attached to each inverter is expected to produce under normal operating conditions.

The example PV electric generation and facility monitoring system 100 further includes one or more meteorological station(s) 124 and one or more POA solar irradiance sensors 130 that are able to be distributed throughout the site and also located at one or more meteorological station(s) 124. The POA solar irradiance sensors 130 are a mix of reference cells, which can include cells disturbed throughout the area covered by the solar panels such as the solar panel array 102, and pyranometers, which can be installed at the meteorological stations 124. The POA solar irradiance sensors 130 in an example measures solar radiation reaching the PV plant at the same tilt and azimuth (plane of array) of the solar panels. The measured POA irradiance 132 reported by the POA solar irradiance sensors 130 are used to determine the amount of electrical power the solar PV array attached to each inverter is expected to produce under normal operating conditions.

In some examples, the POA solar irradiance sensors 130 include a number of sensors that are distributed around an area of solar panels, such as the solar panel array 102. The measured irradiance from each of these sensors received from two or more irradiance sensors in the POA solar irradiance sensors 130 in the area of the solar panels are able to be compared to each to determine a spatial variation of solar irradiance across the area of solar panels. In an example the spatial variation of solar irradiance is determined based on calculating a coefficient of variation of contemporaneous measurements from two or more of the irradiance sensors in the POA solar irradiance sensors 130. The coefficient of variation is defined as the standard deviation of the contemporaneous measurements divided by the mean of the measurements. If all of the irradiance sensors are reporting approximately the same value, the coefficient of variation will be low. If the reported irradiance values differ by a significant amount, indicating spatial variation of solar irradiance across the area of the solar panels, the coefficient of variation has a higher value. Higher values of the coefficient of variation may indicate a period of partial cloud coverage of the solar panels and thus indicate an operating condition that is sufficiently anomalous to cause data collected during such a period to not be used to create or maintain a regression model of the system's operation.

The output power, and its resultant output power measurements 120, is generally a function of the values of the POA irradiance data at the meteorological stations, the data from the POA irradiance sensors installed in the PV array, the data from the BOP temperature sensors, data from other points in the example PV electric generation and facility monitoring system 100, or combinations of these. In an example, the BOP temperature at one or more solar panels in the solar panel array 102 is able to be measured and delivered to the SCADA system 114.

The example PV electric generation and facility monitoring system 100 depicts a number of components in an analysis and monitoring system 170. The analysis and monitoring system 170, as is described in further detail below, is an example of a regression based system monitoring processor that receives data concerning the operation of the example PV electric generation and facility monitoring system 100, processes that data, and identifies anomalous conditions that reduce the electrical power produced by each inverter at the site. In an example, the analysis and monitoring system 170 includes one or more programmable computers that are programmed to perform functions to support performing the below described methods and processes. In an example, the analysis and monitoring system 170 is able to be physically located at the example PV electric generation and facility monitoring system 100. In further examples, the analysis and monitoring system 170 is able to be located at a location that is physically remote from other components of the example PV electric generation and facility monitoring system 100. For example, the analysis and monitoring system 170 is able to be physically remote from one or more of the solar panel array 102, inverter 108, SCADA system 114, other elements, or combinations of these.

The example PV electric generation and facility monitoring system 100 includes a communications interface 136. The communications interface 136 in some examples communicates various data elements from monitored components or measurement systems of the example PV electric generation and facility monitoring system 100 to the components of the analysis and monitoring system 170.

In an example, the communications interface 136 is also able to include processing to collect, summarize and communicate data from the on-site SCADA system 114, and in some examples various other monitored components or measurement systems of the example PV electric generation and facility monitoring system 100, to the components of the analysis and monitoring system 170. The communications interface 136 in such an example uses a specialized data aggregation processor to collect real time data from the on-site SCADA system 114 and other sources in order to produce one-minute mean, max, min and standard deviation values for the various monitored components of the example PV electric generation and facility monitoring system 100. The data aggregation process in an example is able to be particularized or modified according to various factors such as the number of measurement points (i.e. data tags) to be collected and the number of samples to be collected for each tag for each minute. The communications interface 136 in such an example then transfers the data to an off-premises facility for processing and use by the analysis and monitoring system 170. In some examples, monitoring equipment located at the PV electric generation and facility monitoring system 100 provides information to components of the analysis and monitoring system 170 without the use of a communications interface 136. For example, any type of information is able to be communicated by any suitable technique to the analysis and monitoring system 170.

The analysis and monitoring system 170 includes several components that receive data from monitored components of the example PV electric generation and facility monitoring system 100 via the communications interface 136. In this illustrated example, a data classifier 160, a regression model processor 144 and a monitoring processor 146 each receive measured data from components of the example PV electric generation and facility monitoring system 100. In the illustrated example, the data classifier 160, regression model processor 144 and monitoring processor 146 receive measured data reflecting operating conditions and output power of the example PV electric generation and facility monitoring system 100 and perform various operations, including operations to support performing below described processes, to monitor operations of and detect possible anomalous conditions components within the PV electric generation and facility monitoring system 100.

In an example, the data classifier 160 receives measured data from components of the example PV electric generation and facility monitoring system 100 via the communications interface 136. The data classifier 160 processes the received data to identify and remove data points that are likely to be caused by abnormalities for the received measured values of inverter electrical output power, POA irradiance and BOP temperature. Removing these data prevents such invalid data points from negatively impacting the downstream process steps within the analysis and monitoring system 170. The data classifier 160 in an example removes night time data, removes missing data, removes data from inverters that are in a faulted state, classifies the prevailing atmospheric conditions (e.g. clear, overcast, mix of sun and cloud), performs other processing, or combinations of these. In an example, data measured during mix of sun and cloud atmospheric conditions (e.g. partial shading) is filtered out and not passed to the statistical processor 140 or regression model generation processor 142.

In an example, the data classifier 160 sends data to the statistical processor 140. The statistical processor 140, in such an example, receives data from which suspected anomalous data has been removed. The statistical processor 140 determines statistical values and outliers for those data elements. In an example, the statistical processor 140 receives measured values of solar irradiance from the POA solar irradiance sensors, measured values of PV panel temperature from the BOP temperature sensors, measured values from the various weather sensors at the meteorological stations, and the measured output electrical power values as measured by each inverter 108 at the PV electric generation and facility monitoring system 100. The statistical processor 140 in an example computes statistical values associated with the relationships between various received measured values, such as mean values, standard deviation, other statistical quantities, or combinations of these. These statistical values are used in an example as a basis for identifying outliers of the data set.

In an example, the statistical processor 140 determines statistics such as mean values, standard deviation, and the like, for the received values of measured output electrical power as a function of each value of associated environmental data values, such as each of one or more of the contemporarily measured solar irradiance value, panel temperature, other values, or both.

The statistical processor 140 in some examples further selects and filters the received data to create subsets of the data to be used for various operations. In an example, the statistical processor 140 creates a selected data set based on these created subsets of data and that selected data set is used to develop an inverter level regression model for the operation of the PV electric generation and facility monitoring system 100. The selected data set in an example consists of data from which outliers have been removed, where such outliers are able to be defined as data with values that differ from a mean value by more than a specified number of standard deviations. Developing a regression model in various examples is able to include, which includes operations associated with creating, maintaining, or both, the regression model.

The regression model generation processor 142 develops a regression model based on a data set that contains measured values of operating parameters and measured inverter-level output electrical power values. The dataset used for training the regression model in one example is of a duration ranging from two months to twelve months so as to provide the model with enough data to adequately capture the normal operating performance of each inverter in the PV electric generation and facility monitoring system 100. The regression model generation processor 142 develops regression models that map environmental or operational data values, such as POA irradiance values, PV BOP temperatures, atmospheric condition, other values, or combinations of these, to a predicted inverter level AC electrical power output for all inverters within the PV electric generation and facility monitoring system 100.

The regression model processor 144 receives regression model parameters from the regression model generation processor 142 and also receives measured operational data from components of the PV electric generation and facility monitoring system 100 and uses the regression model to predict the electrical AC power output from each inverter that would be expected given the radiative and atmospheric conditions at that time. For example, for a measured value of POA irradiance, BOP temperature, and other variables (e.g. sky condition classification), the regression model processor 144 computes a predicted value of electrical AC power output that would be produced by each inverter in the PV electric generation and facility monitoring system 100 under normal operating conditions.

The monitoring processor 146 receives the predicted value of the electrical AC power output for each inverter that is determined by the regression model processor 144 and compares that predicted value to the measured value of electrical AC power output produced by each inverter in the PV electric generation and facility monitoring system 100. In an example, the monitoring processor 146 compares the predicted value of electrical power output to the actual value of electrical output power measurement 120 that is produced by and received from the inverter 108 in this example. Based on this comparison, the monitoring processor 146 detects anomalous conditions, such as noting that there are differences between predicted electrical output values and the actual output value produced by each inverter in the PV electric generation and facility monitoring system 100. Such differences may indicate a maintenance problem that may require attention by maintenance personnel. In some examples upon detection of an anomalous condition, the monitoring processor generates an anomalous condition indication.

The monitoring processor 146 in an example also identifies measured data that appears to indicate that the output power of each inverter in the PV electric generation and facility monitoring system 100 is varying and is thus likely to deviate from predicted values while still operating normally. In an example, the received measured electrical AC power output from each inverter is processed to determine whether the output power varies with time in a manner that is consistent with variable cloud cover over the solar panel array 102. Such time varying values of electrical power output indicates that differences between measured output electrical power and predicted power may be due to cloud cover (e.g. partial shading) and does not indicate an anomalous condition in the PV electric generation and facility monitoring system 100 that should be handled by maintenance personnel.

An anomaly reports processor 148 receives anomalous conditions indications generated by and sent from the monitoring processor 146. In an example, anomalies are reported into a central database each day and for each inverter. In various examples, anomaly reports are routed to databases for storage and archiving, as well as to one or more to suitable maintenance organizations. In an example the anomaly reports processor 148 sends an anomaly report to a crew dispatch system 150, in order to cause a repair crew to be dispatched to the problem point in the PV electric generation and facility monitoring system 100.

The statistical processor 140 is an example of a received data processor. The illustrated combination of the regression model generation processor 142, regression model processor 144, monitoring processor 146 are an example of a regression model processor, the regression model monitoring processor.

Figure 2:
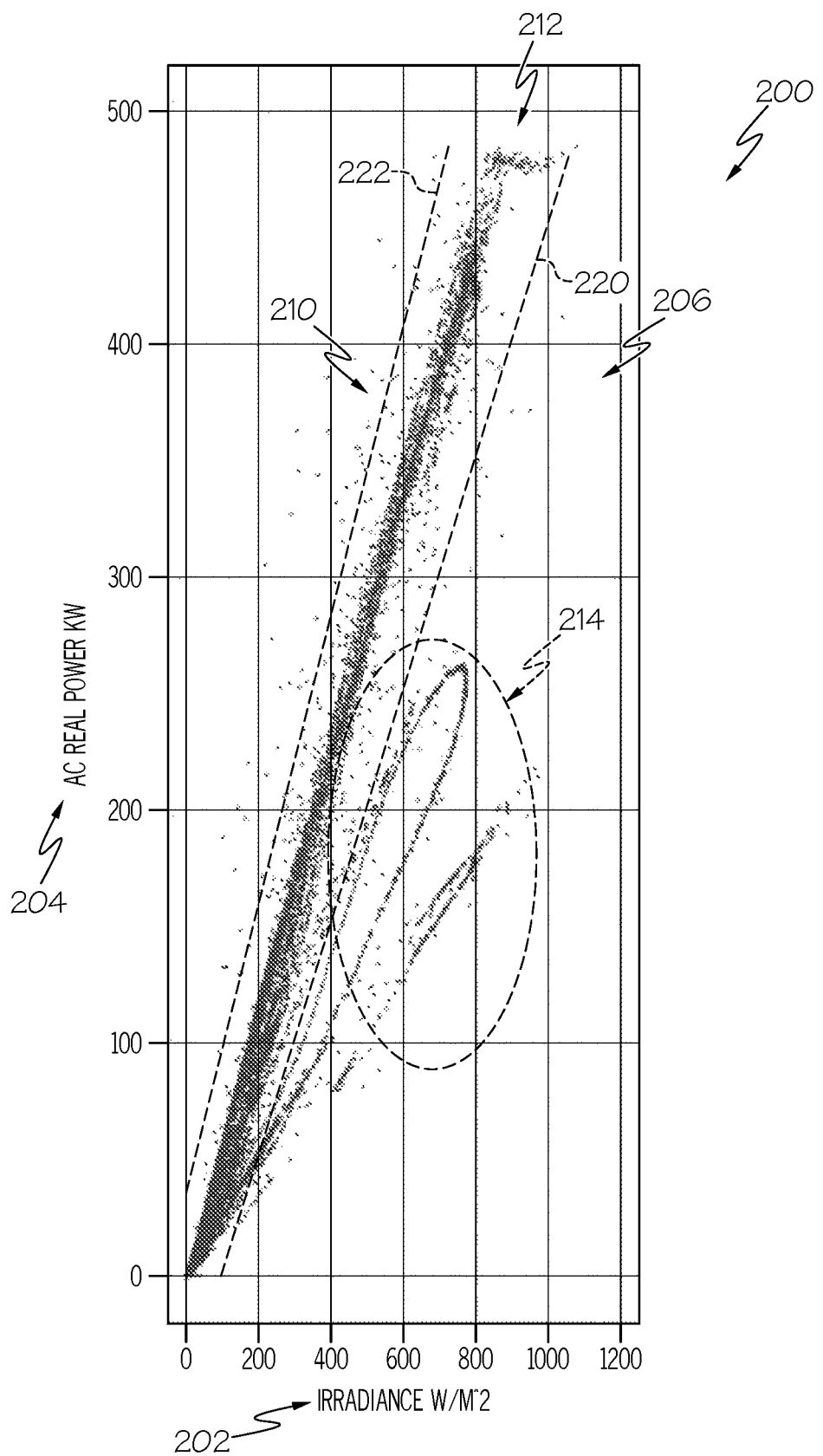
FIG. 2 illustrates an example POA Irradiance to AC Inverter Output Power dataset, according to an example.

FIG. 2 below illustrates an example POA irradiance to AC output power dataset 200 for an example inverter. This description of the example POA irradiance to inverter output power dataset refers to elements discussed above with regards to the PV electric generation and facility monitoring system 100. The example POA irradiance to inverter output power dataset depicts a number of received data points that include values of measured and collected data that show relationships between POA irradiance values, as measured by the POA solar irradiance sensor 130, and the electrical output power value of one inverter in a PV electric generation system. In this example, the electrical output power value is reported as the AC Real Power (i.e., the voltage multiplied by the current that is in phase with voltage) that is measured and reported by the inverter 108 into the SCADA system 114.

The Irradiance to Output Power dataset 200 includes an Irradiance axis 202, which has a scale in Watts/square meter, and an AC Real Power axis 204, which has a scale in Kilowatts. Values along the AC Real Power axis 204 are referred to below as output power values. The illustrated Irradiance to Output Power dataset 200 shows a large number of received data points 206 that were collected over many days and under various environmental and/or atmospheric conditions and thus reflects output power over a fairly large range of received solar irradiance values.

In an example, the statistical processor 140 receives values of quantities measured by various instruments in the PV electric generation and facility monitoring system 100 and calculates statistical quantities associated with that data. As depicted in the example Irradiance to Output Power dataset 200, the mean value and standard deviation ($\sigma$) are calculated by the statistical processor 140 for the power output as a function of Irradiance.

The Irradiance to Output Power dataset 200 depicts a mean ray 212 as a dense, collection of points that corresponds to the mean normal operating conditions for the inverter (i.e. normal value of measured Output Power as a function of Irradiance). This dense linear collection of points in the mean ray 212 represents the regression model and, while not explicitly depicted in the Irradiance to Output Power dataset 200, starts at a (0, 0) point of the Irradiance and output power axes and extends towards the upper right quadrant of the plot. In general, the measured Output Power increases as a function of Irradiance until the inverter power clipping point is reached. Once the inverter clipping point is reached, the collected data set extends horizontally with increasing irradiance until the max irradiance is reached.

The Irradiance to Output Power dataset 200 also includes two "n$\sigma$" (n*sigma) lines, a plus n$\sigma$ line 222 and a minus n$\sigma$ line 220. The two n$\sigma$ lines indicates values that are a specified multiple (i.e., "n" in this example) of the standard deviation ($\sigma$) from the mean ray 212. In an example, a value of 2.5 is used for $\sigma$. In further examples, any suitable value determined by any suitable technique is able to be used as a multiplier of the standard deviation by this processing. The irradiance to Output Power dataset 200 includes a selected data set 210 that includes the data points that have values between the two n$\sigma$ lines. In an example, the selected data set 210, which excludes data points outside the two n$\sigma$ lines, is the data selected to create and maintain a regression model used to monitor an operating system that creates the received data points 206. In some examples, boundaries of values for the selected data set are able to be set by any suitable technique as an alternative to the depicted nσ lines. In an example, any boundary lines are able to be defined where the lines are able to be symmetrical or not symmetrical around the mean ray 212.

As an example, for PV sites in northern latitudes, snow often falls and accumulates on the surface of PV panels. The snow covered panels will cause the inverter's measured AC power output to drop well below its normal operating output. As such, this snow impacted AC power output data 214 would be excluded from the training dataset used in the regression model generation step as this data would incorrectly distort the shape of the regression model. Also depicted in the received data points 206 is a snow affected set of data 214. The snow affected set of data 214 in this example depicts reduced output power values because solar panels within the solar panel array 102 were covered with snow when these output power values were measured. In some examples, processing of the received data points 206 categorizes the snow affected set of data 214 based on their statistical relationship with the remainder of the received data points 206. In this example, the snow affected set of data 214 has an outlier relationship within the received data points 206 with output power values that are below the minus nσ line 220. In some examples, information such as weather information from on-site meteorological stations indicating snowfall at the time of measuring the snow affected set of data 214, is able to support its characterization.

In such an example, data points within the selected data set 210 are categorized based on various characteristics. For example, the selected data set 210 is categorized as being representative of normal or good operations of the PV electric generation system while the snow affected set of data 214 is categorized as corresponding to reduced output power due to snow coverage of the solar panels. Categorizing data points in some examples is able to be based on information regarding conditions or events at the solar panels at the time the data points were measured. In the example of the snow affected set of data 214, receiving an indication of snowfall preceding or during the reduced power output levels measured in the snow affected set of data 214 may be an indication of an event to which data is to be associated. The categorization described above is an example of dividing, based on the at least one statistical relationship, the first set of data into the selected data set 210 and at least one other set of data, e.g., the snow affected set of data 214 where the outlying data includes the at least one other set of data. One set of data within the at least one other set of data is associated with an event, e.g., snow fall.

Figure 3:
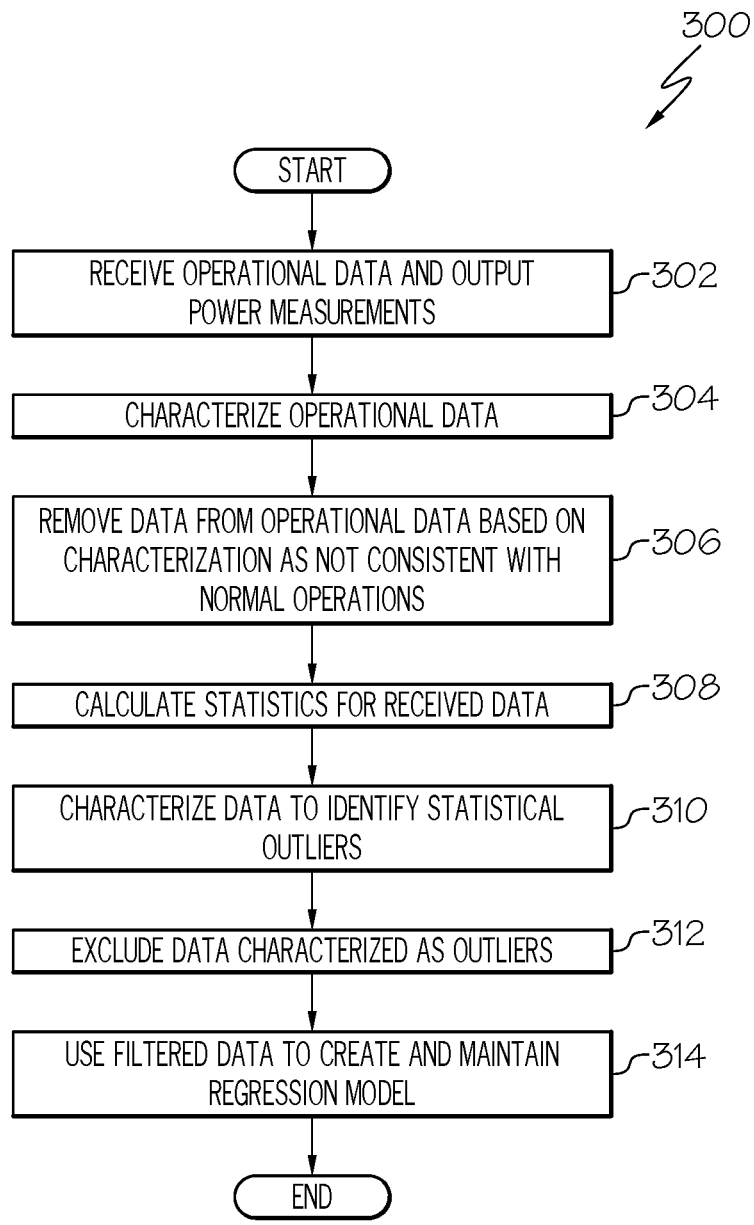
FIG. 3 illustrates a regression model development process, according to an example.

FIG. 3 illustrates a regression model development process 300, according to an example. The regression model development process 300 is an example of a process to create or maintain a regression model that is suitable for use in monitoring the performance of an operating system, such as a PV solar generation site, to detect potential performance problems that may require maintenance action. In an example, a regression model is said to be created for a system when no existing regression model exists for a particular system. In an example, an existing regression model is maintained by being updated to incorporate new data into the formulation of the regression model in order to cause the regression model to more closely predict the operation of the system in its present condition. In the present discussion, development of a regression model includes either creating or generating a regression model, maintaining a regression model, or combinations of these. In an example, the regression model development process 300 is performed by components of the analysis and monitoring system 170, such as one or more of the data classifier 160, statistical processor 140, and the regression model generation processor 142 that are discussed above.

The regression model development process 300 receives, at 302, operational data and output power measurements for an operational system such as a PV electrical generation site. An example of such an operational system is a site including the above described solar panel array 102 and inverter 108. In an example, operational data includes POA irradiance, such as is measured by a POA solar irradiance sensor 130, and BOP temperature, as is reported by sensors adhered to the back of one or more solar panels within the solar panel array 102. In further examples, any data that is relevant to the operations of the PV electrical generation site are able to be received as operational data. The received operational data and output power measurements in an example include operational data and output power measurements that were measured and accumulated during a time duration. These data are measured and accumulated during a time duration that precedes monitoring the operational system by a regression model that is to be developed based on this received operational data and output power measurements. In some examples, other information associated with the performance of a PV electrical generation site are able to be received as a variable that is to be predicted by a regression model based on the corresponding values of operational data. In one example, this data is able to be received from one PV electrical generation site.

The received data includes a number of measured output power values and associated environmental data values. In the present discussion, associated environmental data values refers to values that indicate various conditions or values at the site at the time when each of the measured output values for the electrical generation system are measured. Such conditions include the environmental, atmospheric, radiative, or combinations of these, conditions at the site. In an example, each measured output power value has one or more associated environmental data values that indicate the atmospheric and radiative conditions, such as the contemporary POA irradiance value, BOP temperature, air temperature, other conditions or values, or combinations of these, that were present when that particular output power value was measured.

Data within the received data are characterized, at 304. Characterization at this stage includes identifying data that is not consistent with normal operations and thus is not beneficial to creation of the regression model. For example, the following data could be characterized as non-beneficial for use in creating a regression model: night time data, negative inverter power data, data with some values or data points missing, erroneously large inverter power measurements, data from inverters that are in a faulted state, or combinations of these. Data is also characterized by the prevailing atmospheric conditions (i.e. clear, overcast, mix of sun and cloud). For example, data measured under highly variable cloud conditions (i.e. mix of sun and cloud or partial shading) are characterized as they are non-beneficial to creation of the regression model. However, data measured under clear or overcast conditions are useful for developing the regression model.

In an example, partial cloud covering of an area of solar panels is determined based on a coefficient of variation of the values of solar irradiance that are contemporaneously measured by a number of irradiance sensors in the POA solar irradiance sensors 130. In various examples, variations of irradiance are determined for readings from 1) the same one or more sensors over relatively short periods of time, which is referred to as temporal variation, 2) over different sensors that are located at different locations around a solar panel array, which is referred to as spatial variation, or 3) both of these. As discussed above, higher values of the coefficient of variation of values of either temporal or spatial variation of solar irradiance that are contemporaneously measured by multiple sensors may indicate a period of partial cloud coverage of the solar panels. In some examples, the determined values of the coefficient of variation of values of contemporaneously measured solar irradiance by different sensors in an area of solar panels are compared to a threshold. Values within the received data that were measured during periods when the values of the coefficient of variation for measured solar irradiance exceeded the threshold are characterized as not consistent with normal operations and are excluded from data used to create or maintain a regression model. The value threshold to be used to compare the coefficient of variation is able to be determined by any suitable technique such as qualitative analysis of the solar panels' arrangement.

In an example, data that is not consistent with normal operations includes data where the rate of change with time of inverter output power values within at least one portion of the output power values exceeds a threshold. In an example, the received data is analyzed by determining if the inverter output power that has a time variation greater than a threshold. If a portion of the received data is determined to have this time variation characteristic, the output data that comprises output power values with such time variations are determined to be outliers and are removed from the data used to create the regression model. In some alternative examples, output power value data that exhibits a rate of change versus time that exceeds a threshold is excluded from data before statistics for the remaining data are determined Data is removed from the received operational data, at 306, based on the characterization of the data as not consistent with normal operations.

Statistics are calculated, at 308, for the received data. In an example, the statistics that are calculated include a mean value of the set of output power values for each value of each associated operational data set and a variance value of the set of output power values for each value of each associated operational data set. In an example where received irradiance and solar panel temperature is received, the mean value of output power is determined for each value of received irradiance and each value of solar power temperature. In an example, the determined variance includes a standard deviation of the output power values.

The data is characterized, at 310, to identify outliers based on the statistics of the received data. In an example, outliers include data determined to be outlier values such as are described above. In an example, outlier values of the received output power values are values that differ from the mean value by at least 2.5 times the standard deviation of any of the operational data sets.

Data characterized as outliers is excluded from the data, at 312. In an example, outliers are determined as described above.

The filtered data is used to create and maintain, at 314, a regression model for the operation of each inverter in PV electric generation and facility monitoring system 100. In an example, the regression model is able to be used to predict electrical power output values for each inverter in the PV electric generation and facility monitoring system 100 for a given set of values of operational data. The regression model development process 300 then ends.

Figure 4:
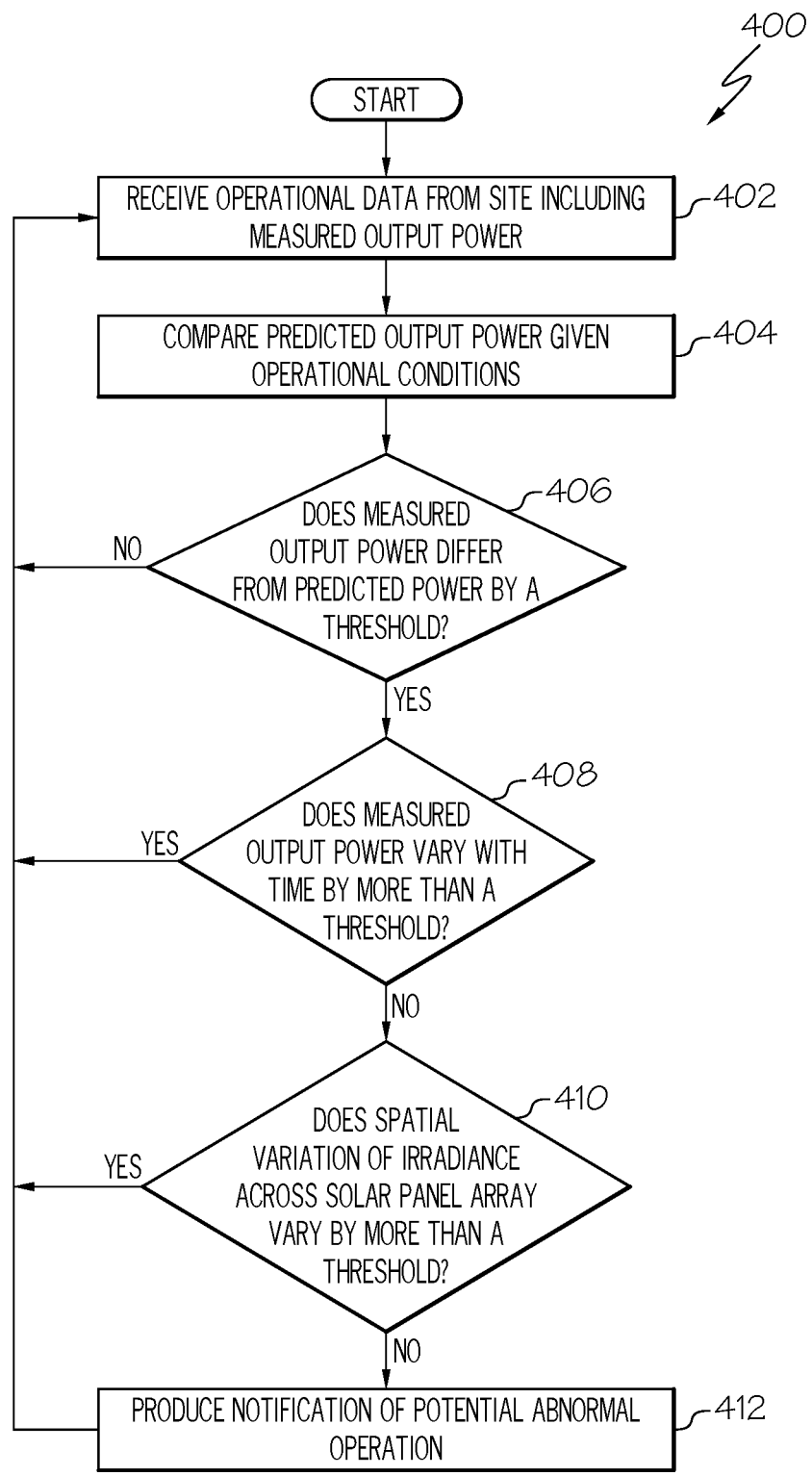
FIG. 4 illustrates a regression model based system monitoring process, according to an example.

FIG. 4 illustrates a regression model based system monitoring process 400, according to an example. The regression model based system monitoring process 400 operates to predict electrical power output values for an operational system, such as the PV electric generation and facility monitoring system 100 discussed above, for a given set of values of operational data, receives measured output power data from that operational system, compares the measured data to predicted data and identifies output power discrepancies and provides notifications of anomalies if output power discrepancies are identified. In an example, the regression model based system monitoring process 400 uses a regression model that is developed according to the regression model development process 300 discussed above. In an example, the regression model based system monitoring process 400 operates by accessing stored data that was previously measured and stored in a database.

The regression model based system monitoring process 400 begins by receiving, at 402, operational data from the site that includes measured output power from each inverter at the site. In an example, the received operational data is an example of monitored data that includes an amount of POA irradiance, such as is measured by the POA solar irradiance sensors 130, and BOP temperature, as is reported by sensors located on the back of one or more solar panels within the solar panel array 102. In an example, these data are measured over a monitoring time that is subsequent to the time duration during which data that was used to create the regression model were measured. In further examples, any data that is relevant to the operations of the PV electrical generation site are able to be received as operational data. In some examples, other information associated with the performance of a PV electrical generation site are able to be received as a variable that is to be predicted by a regression model based on the corresponding values of operational data. In an example, these data are received from a database or other data storage and consist of data that had been previously measured and stored.

The predicted output power value for each inverter at the site given the operational data is computed, at 404. In an example, the predicted value is computed based on a regression model that is created based on filtered and selected data, as is discussed above with regards to the regression model development process 300.

A determination is made, at 406, as to whether the received measured inverter output power of the site differs from the predicted value by a threshold. If this difference is below the threshold, the regression model based system monitoring process 400 classifies the measurement as normal and returns to receiving operational data and measured output power from the site, at 402.

If it is determined the difference between the measured output power and the predicted value is greater than the threshold, a determination is made, at 408, as to whether the measured output power varies with time by more than a threshold. This determination is an example of determining that a rate of change with time of monitored output power values within at least one portion of the monitored output power values exceeds a threshold. If this difference is above the threshold, the regression model based system monitoring process 400 classifies the measurement as normal and returns to receiving operational data and measured output power from the site, at 402. Returning to receiving operational data, and not proceeding to report this data as abnormal operation as is described below, is an example of excluding monitored power values within the at least one portion from the monitored output power values used in the comparing.

If it is determined the measured output power does not vary with time by more than the threshold, a determination is made, at 410, as to whether the spatial variation of irradiance across the solar panel array varies by more than a threshold. An example of determining spatial variation of irradiance is described in detail above.

a notification of potential abnormal operation is produced, at 412. In an example, the provided notification is able to include a flag that is stored in data produced by a monitoring process that includes the regression model based system monitoring process 400. The regression model based system monitoring process 400 then ends.

Figure 5:
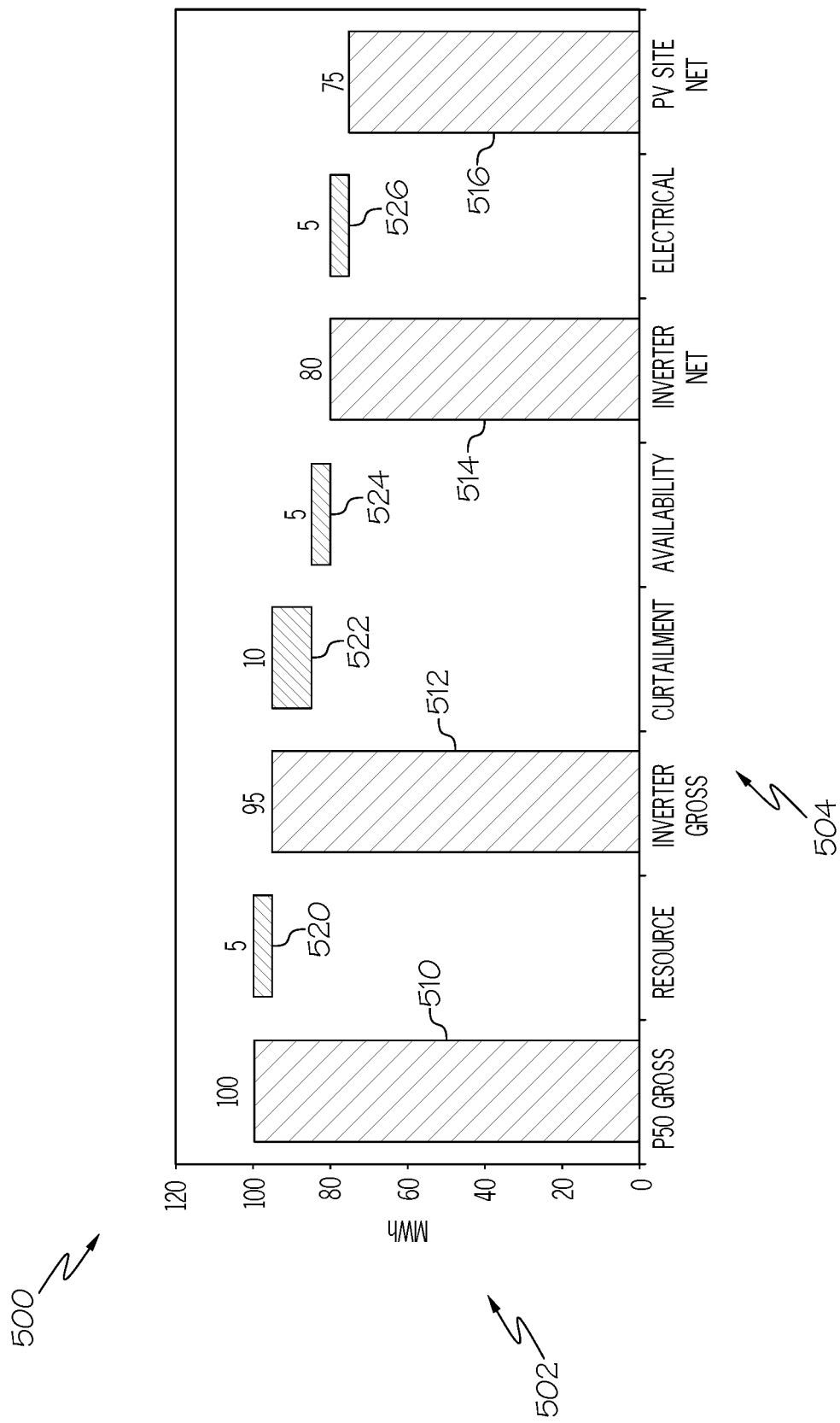
FIG. 5 illustrates a Gross to Net Power Output chart for a solar power electrical generation site, according to an example.

FIG. 5 illustrates a Gross-to-Net energy waterfall chart 500 for a solar power electrical generation site, according to an example. The Gross-to-Net energy waterfall chart 500 depicts the long term average (P50) gross energy value 510 for all inverters in the solar PV plant, the gross energy 512 from all inverters in the PV plant, the actual inverter net output value 514, which is the net energy from all inverters in the PV plant, and the site output value 516, which is the actual revenue meter net energy for the site. The Gross-to-Net energy waterfall chart 500 represents data from the long term expected generation at the inverter AC power outputs to the site revenue meter AC electrical power output interface with the electric grid for a given period of time. The description of the Gross to Net energy waterfall chart 500 refers to the PV electric generation and facility monitoring system 100 described above. The energy levels depicted in the Gross to Net energy waterfall chart 500 are predicated based on the present level of POA irradiance, BOP temperature and other input variables, such as would be measured by a POA solar irradiance sensors 130 and BOP temperature sensor and other sensors. The Gross-to-Net energy waterfall chart 500 also depicts losses at various points in the chain and assists in analyzing the operation of the solar power electrical generation site.

The Gross-to-Net energy waterfall chart 500 has a horizontal axis that indicates distance along the chain of components within the solar power electrical generation site. A vertical axis indicates electrical energy output in MegaWatt-Hours (MWh).

The Gross-to-Net energy waterfall chart 500 in this example begins with long term average (P50) gross energy Value 510, which is an average value for a given period of time that is calculated using an industry standard theoretical model or operational assessment. In an example, the theoretical model is based on specifications or other characterizations of solar panels and other equipment located at the solar power electrical generation site. Such a theoretical model predicts the amount of gross electrical energy generated by each inverter at the solar PV site over a long term period. These results are then averaged for any desired time period to produce the long term average (P50) gross energy. The long term average (P50) gross energy value 510 has a "100" on its top to indicate that this is 100% of the available gross power.

The Gross-to-Net energy waterfall chart 500 next has an actual inverter gross energy output that indicates either good/normal data values for the inverters or a predicted value produced by the regression model processor 144 and represents regression model output values. The regression model output values that correspond to the inverter gross energy 512 are predicted by the regression model processor 144 based on parameters calculated by the regression model generation processor 142 and also as a function of the received amount of POA irradiance as measured by the POA solar irradiance sensors 130. The difference between the long term average (P50) gross energy value 510 and the actual inverter gross energy 512, which can be either normal measurement values and values predicted as the regression model output value, represents the resource loss/gain 520 for a given time period. The resource loss/gain 520 in an example is determined by both the solar resource and ambient temperature conditions for the given time period. In this illustrated example, the normal and regression model output values of the inverter gross energy 512 has a "95" on top to indicate that it comprises 95% of the total available energy, and the resources loss/gain 520 has a "5" that indicates it is a loss representing 5% of the total available energy.

The Gross-to-Net energy waterfall chart 500 next has an inverter net output value 514. The inverter net output value 514 in an example is the net energy measured at the AC output of the inverter 108. The inverter net output value 514 has an "80" on top indicating that it represents 80% of the total available energy.

An inverter level energy loss values in this example include a curtailment value 522 and an availability loss 524. The inverter level energy loss values in an example represent the difference between the actual inverter gross energy 512 and the actual inverter net output value 514. These differences are able to be caused by various factors. Some of the energy loss values are caused by intentional curtailment of the solar power electrical generation site. Such curtailment is caused by control of the site and in an example, values of the inverter net output are flagged to indicate that the power was produced while curtailment was in effect and is indicated by the curtailment value 522. Other amounts of the energy loss include availability loss 524 and may indicate a problem with one or more components of the PV electric generation and facility monitoring system 100 that should be further investigated. These types of losses are termed availability loss and in an example may be caused by an inverter fault, inverter derate, PV array problem, or any other system fault. In an example, a maintenance crew may be dispatched to investigate any potential problems that could be a cause of unexpected increases in the availability loss 524. The curtailment value 522 has a "10" on top and the availability loss 524 has a "5" on top representing these values are 10% and 5% of total available energy, respectively.

The Gross-to-Net energy waterfall chart 500 next has a site output value 516. The site output value 516 in an example is the output energy measured at the output of the site, such as by a revenue grade meter located at an interface with the grid 122. Another energy loss value, the electrical loss 526, is a difference between the inverter net output value 514 and the site output value 516. The electrical loss value 526 in an example represents losses in the electrical line/transformer system after the inverter 108. Unexpected increases in the electrical loss value 526 may indicate problems that should be investigated. In some examples, unexpected increases in the third power loss value cause a service crew to be dispatched to investigate any potential problems.

Figure 6:
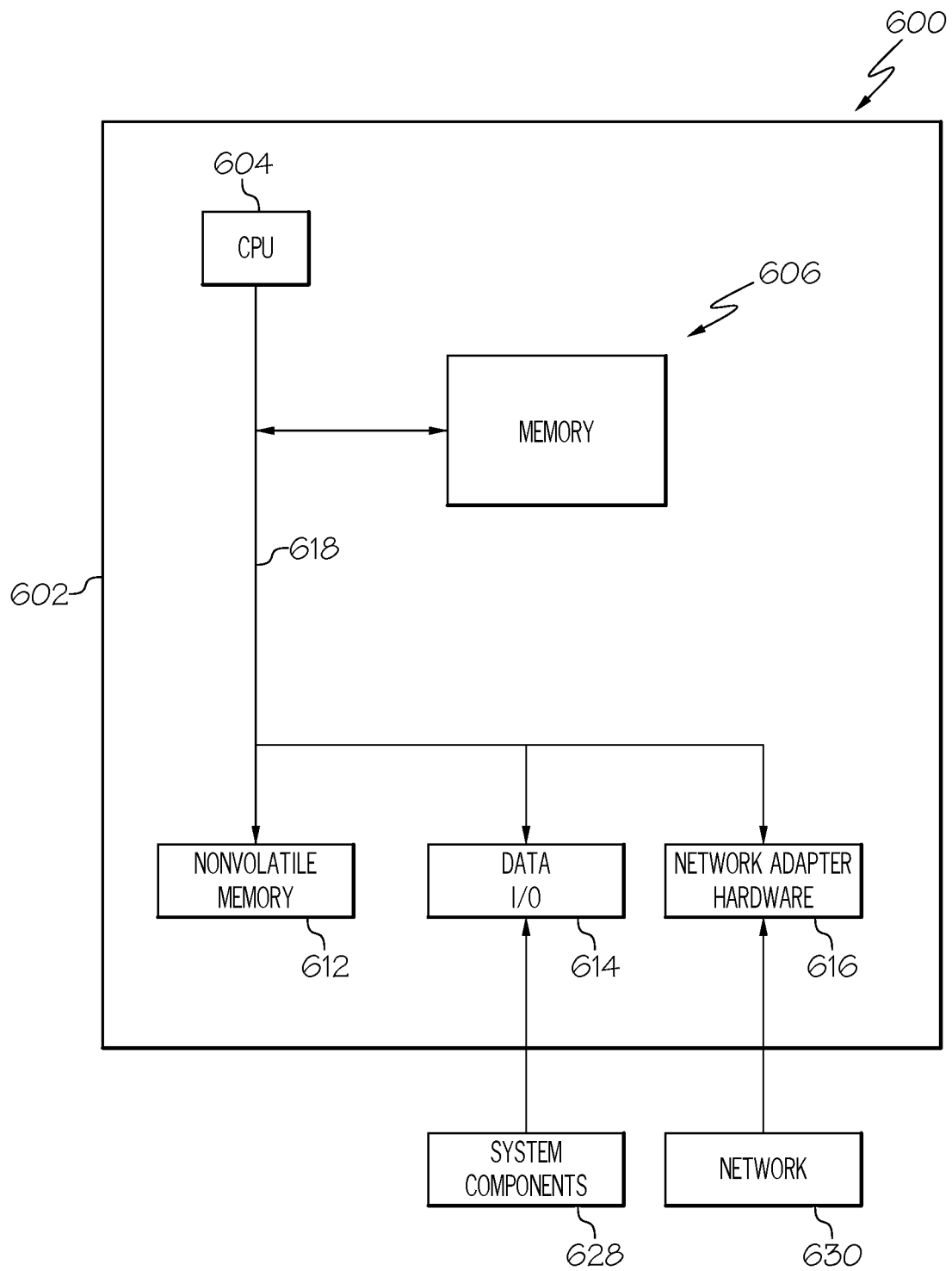
FIG. 6 illustrates a block diagram illustrating a processor, according to an example.

FIG. 6 illustrates a block diagram illustrating a processor 600 according to an example. The processor 600 is an example of a processing subsystem that is able to perform any of the above described processing operations, control operations, other operations, or combinations of these.

The processor 600 in this example includes a CPU 604 that is communicatively connected to a main memory 606 (e.g., volatile memory), a non-volatile memory 612 to support processing operations. The CPU is further communicatively coupled to a network adapter hardware 616 to support input and output communications with external computing systems such as through the illustrated network 630.

The processor 600 further includes a data input/output (I/O) processor 614 that is able to be adapted to communicate with any type of equipment, such as the illustrated system components 628. The data input/output (I/O) processor in various examples is able to be configured to support any type of data communications connections including present day analog and/or digital techniques or via a future communications mechanism. A system bus 618 interconnects these system components.

Information Processing System

The present subject matter can be realized in hardware, software, or a combination of hardware and software. A system can be realized in a centralized fashion in one computer system, or in a distributed fashion where different elements are spread across several interconnected computer systems. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein.

The present subject matter can also be embedded in a computer program product, which comprises all the features enabling the implementation of the methods described herein, and which—when loaded in a computer system—is able to carry out these methods. Computer program in the present context means any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least a computer readable medium allowing a computer to read data, instructions, messages or message packets, and other computer readable information from the computer readable medium. The computer readable medium may include computer readable storage medium embodying non-volatile memory, such as read-only memory (ROM), flash memory, disk drive memory, CD-ROM, and other permanent storage. Additionally, a computer medium may include volatile storage such as RAM, buffers, cache memory, and network circuits. Furthermore, the computer readable medium may comprise computer readable information in a transitory state medium such as a network link and/or a network interface, including a wired network or a wireless network, that allow a computer to read such computer readable information. In general, the computer readable medium embodies a computer program product as a computer readable storage medium that embodies computer readable program code with instructions to control a machine to perform the above described methods and realize the above described systems.

NON-LIMITING EXAMPLES

Although specific embodiments of the subject matter have been disclosed, those having ordinary skill in the art will understand that changes can be made to the specific embodiments without departing from the spirit and scope of the disclosed subject matter. The scope of the disclosure is not to be restricted, therefore, to the specific embodiments, and it is intended that the appended claims cover any and all such applications, modifications, and embodiments within the scope of the present disclosure.

What is claimed is:

1. A method for monitoring an operational system, the method comprising:
  accumulating, over a time duration, a first set of data comprising a set of inverter output power values of an electrical generation system and associated environmental data values for the electrical generation system that are measured during the time duration;
  determining at least one statistical relationship between output power values within the set of inverter output power values and environmental data values within the associated environmental data values;
  determining that a rate of change with time of output power values within at least one portion of the inverter output power values exceeds a threshold;
  determining, based on the at least one statistical relationship, outlying data within the first set of data;
  creating a selected set of data by removing the outlying data from the first set of data and by removing the output power values that comprise output power values within the at least one portion of the output power values;
  developing, based on the selected set of data, a regression model mapping predicted inverter output power values to values of environmental data;
  receiving monitored data comprising monitored inverter output power values of the electrical generation system and monitored associated environmental data for the electrical generation system, where the monitored inverter output power values of the electrical generation system and monitored associated environmental data for the electrical generation system comprise values measured over a monitoring time duration that is subsequent to the time duration;
  determining, based on the regression model and the monitored associated environmental data, predicted inverter output power values of the electrical generation system corresponding to the monitored associated environmental data;
  identifying an output power discrepancy based on comparing the predicted inverter output power values to the monitored inverter output power values; and
  providing a notification of an anomaly based on identification of the output power discrepancy.

2. The method of claim 1, wherein the electrical generation system comprises a photovoltaic electrical generation system, and the method further comprising:
  determining that a spatial variation of solar irradiance across an area of solar panels providing energy to the electrical generation system exceeds a threshold during a first period, and
  wherein creating the selected set of data further comprises removing the output power values that are measured during the first period.

3. The method of claim 1, wherein the at least one statistical relationship comprises:
  a mean value of the set of output power values for each value of associated environmental data values; and
  a variance value of the set of output power values for each value of associated environmental data values, wherein the variance value comprises a standard deviation of the output power values, and wherein determining the outlying data comprises determining data that differs by 2.5 times the standard deviation.

4. A method for monitoring an operational system, the method comprising:

accumulating, over a time duration, a first set of data comprising a set of inverter output power values of an electrical generation system and associated environmental data values for the electrical generation system that are measured during the time duration;

determining at least one statistical relationship between output power values within the set of inverter output power values and environmental data values within the associated environmental data values;

determining, based on the at least one statistical relationship, outlying data within the first set of data;

creating a selected set of data by removing the outlying data from the first set of data;

developing, based on the selected set of data, a regression model mapping predicted inverter output power values to values of environmental data;

receiving monitored data comprising monitored inverter output power values of the electrical generation system and monitored associated environmental data for the electrical generation system, where the monitored inverter output power values of the electrical generation system and monitored associated environmental data for the electrical generation system comprise values measured over a monitoring time duration that is subsequent to the time duration;

determining, based on the regression model and the monitored associated environmental data, predicted inverter output power values of the electrical generation system corresponding to the monitored associated environmental data;

determining that a rate of change with time of monitored output power values within at least one portion of the monitored output power values exceeds a threshold;

identifying an output power discrepancy based on comparing the predicted inverter output power values to the monitored inverter output power values, where monitored power values within the at least one portion are excluded from the monitored output power values used in the comparing; and providing a notification of an anomaly based on identification of the output power discrepancy.

5. The method of claim 4, wherein the electrical generation system comprises a photovoltaic electrical generation system.

6. The method of claim 5, further comprising:

determining that a spatial variation of solar irradiance across an area of solar panels providing energy to the electrical generation system exceeds a threshold during a first period, and wherein creating the selected set of data further comprises removing the output power values that are measured during the first period.

7. The method of claim 4, further comprising:

dividing, based on the at least one statistical relationship, the first set of data into the selected set of data and at least one other set of data, the outlying data comprising the at least one other set of data; and associating one set of data within the at least one other set of data with an event.

8. The method of claim 4, wherein the at least one statistical relationship comprises:

a mean value of the set of output power values for each value of associated environmental data values; and a variance value of the set of output power values for each value of associated environmental data values.

9. The method of claim 8, wherein the variance value comprises a standard deviation of the output power values, and wherein determining the outlying data comprises determining data that differs by 2.5 times the standard deviation.

10. A regression based system monitoring processor, comprising:

a processor;

a memory communicatively coupled to the processor;

a received data processor that, when operating, is configured to:

accumulate, over a time duration, a first set of data comprising a set of output power values of an electrical generation system and associated environmental data values for the electrical generation system;

determine at least one statistical relationship between output power values within the set of output power values and environmental data values within the associated environmental data values;

determine, based on the at least one statistical relationship, outlying data within the first set of data;

determine that a rate of change with time of output power values within at least one portion of the output power values exceeds a threshold;

create a selected set of data by removing the outlying data from the first set of data, and removing the output power values that comprises output power values within the at least one portion of the output power values;

a regression model monitoring processor that, when operating, is configured to:

develop, based on the selected set of data, a regression model mapping predicted inverter output power values to values of environmental data;

receive, over a monitoring time duration that is subsequent to the time duration, monitored data comprising monitored inverter output power values of the electrical generation system and monitored associated environmental data for the electrical generation system;

determine, based on the regression model and the monitored associated environmental data, predicted output power values of the electrical generation system corresponding to the monitored associated environmental data;

identify an output power discrepancy based on a comparison of the predicted output power values to the monitored output power values; and provide a notification of an anomaly based on identification of the output power discrepancy.

11. The regression based system monitoring processor of claim 10, wherein the electrical generation system comprises a photovoltaic electrical generation system.

12. The regression based system monitoring processor of claim 11, wherein the received data processor, when operating, is further configured to:

determine that a spatial variation of solar irradiance across an area of solar panels providing energy to the electrical generation system exceeds a threshold during a first period, and wherein the received data processor, when operating, is further configured to create the selected set of data by at least removing the output power values that are measured during the first period.

13. The regression based system monitoring processor of claim 10, wherein the received data processor, when operating, is further configured to:

divide, based on the at least one statistical relationship, the first set of data into the selected set of data and at least one other set of data, the outlying data comprising the at least one other set of data; and associate one set of data within the at least one other set of data with an event.

14. The regression based system monitoring processor of claim 10, wherein the at least one statistical relationship comprises:

a mean value of the set of output power values for each value of associated environmental data values; and a variance value of the set of inverter output power values for each value of associated environmental data values.

15. The regression based system monitoring processor of claim 14, wherein the variance value comprises a standard deviation of the output power values, and wherein determining the outlying data comprises determining data that differs by 2.5 times the standard deviation.

16. A regression based system monitoring processor, comprising:

a processor;

a memory communicatively coupled to the processor;

a received data processor that, when operating, is configured to:

accumulate, over a time duration, a first set of data comprising a set of output power values of an electrical generation system and associated environmental data values for the electrical generation system;

determine at least one statistical relationship between output power values within the set of output power values and environmental data values within the associated environmental data values;

determine, based on the at least one statistical relationship, outlying data within the first set of data;

create a selected set of data by removing the outlying data from the first set of data;

a regression model monitoring processor that, when operating, is configured to:

develop, based on the selected set of data, a regression model mapping predicted inverter output power values to values of environmental data;

receive, over a monitoring time duration that is subsequent to the time duration, monitored data comprising monitored inverter output power values of the electrical generation system and monitored associated environmental data for the electrical generation system;

determine, based on the regression model and the monitored associated environmental data, predicted output power values of the electrical generation system corresponding to the monitored associated environmental data;

determine that a rate of change with time of monitored output power values within at least one portion of the monitored output power values exceeds a threshold; and identify an output power discrepancy based on a comparison of the predicted output power values to the monitored output power values, where monitored power values within the at least one portion are excluded from the monitored output power values used the comparison; and provide a notification of an anomaly based on identification of the output power discrepancy.

17. The regression based system monitoring processor of claim 16, wherein the electrical generation system comprises a photovoltaic electrical generation system, and wherein the received data processor, when operating, is further configured to:

determine that a spatial variation of solar irradiance across an area of solar panels providing energy to the electrical generation system exceeds a threshold during a first period, and create the selected set of data by at least removing the output power values that are measured during the first period.

18. The regression based system monitoring processor of claim 16, wherein the at least one statistical relationship comprises:

a mean value of the set of output power values for each value of associated environmental data values; and a variance value of the set of inverter output power values for each value of associated environmental data values, wherein the variance value comprises a standard deviation of the output power values, and wherein the received data processor, when operating, is further configured to determine the outlying data by at least determining data that differs by 2.5 times the standard deviation.

19. A computer program product for monitoring an operational system, the computer program product comprising:

a non-transitory computer readable storage medium having computer readable program code embodied therewith, the computer readable program code comprising instructions for:

accumulating, over a time duration, a first set of data comprising a set of inverter output power values of an electrical generation system and associated environmental data values for the electrical generation system;

determining at least one statistical relationship between output power values within the set of output power values and environmental data values within the associated environmental data values;

determining, based on the at least one statistical relationship, outlying data within the first set of data;

creating a selected set of data by removing the outlying data from the first set of data;

developing, based on the selected set of data, a regression model mapping predicted output power values to values of environmental data;

receiving, over a monitoring time duration that is subsequent to the time duration, monitored data comprising monitored output power values of the electrical generation system and monitored associated environmental data for the electrical generation system;

determining, based on the regression model and the monitored associated environmental data, predicted inverter output power values of the electrical generation system corresponding to the monitored associated environmental data;

determining that a rate of change with time of monitored output power values within at least one portion of the monitored output power values exceeds a threshold;

identifying an output power discrepancy based on comparing the predicted output power values to the monitored output power values, where monitored power values within the at least one portion are excluded from the monitored output power values used in the comparing; and providing a notification of an anomaly based on identification of the output power discrepancy.

20. The computer program product of claim 19, wherein the electrical generation system comprises a photovoltaic electrical generation system.

21. The computer program product of claim 20, the computer readable program code further comprising instructions for:

determining that a spatial variation of solar irradiance across an area of solar panels providing energy to the electrical generation system exceeds a threshold during a first period, and wherein the instructions for creating the selected set of data further comprise instructions for removing the output power values that are measured during the first period.

22. The computer program product of claim 19, the computer readable program code further comprising instructions for:

dividing, based on the at least one statistical relationship, the first set of data into the selected set of data and at least one other set of data, the outlying data comprising the at least one other set of data; and associating one set of data within the at least one other set of data with an event.

23. The computer program product of claim 19, wherein the at least one statistical relationship comprises:

a mean value of the set of output power values for each value of associated environmental data values; and a variance value of the set of output power values for each value of associated environmental data values.

24. The computer program product of claim 23, wherein the variance value comprises a standard deviation of the output power values, and wherein the instructions for determining the outlying data comprise instructions for determining data that differs by 2.5 times the standard deviation.

25. A computer program product for monitoring an operational system, the computer program product comprising:

a non-transitory computer readable storage medium having computer readable program code embodied therewith, the computer readable program code comprising instructions for:

accumulating, over a time duration, a first set of data comprising a set of inverter output power values of an electrical generation system and associated environmental data values for the electrical generation system;

determining at least one statistical relationship between output power values within the set of output power values and environmental data values within the associated environmental data values;

determining that a rate of change with time of output power values within at least one portion of the inverter output power values exceeds a threshold determining, based on the at least one statistical relationship, outlying data within the first set of data;

creating a selected set of data by removing the outlying data from the first set of data and by removing the output power values that comprises output power values within the at least one portion of the output power values;

developing, based on the selected set of data, a regression model mapping predicted output power values to values of environmental data;

receiving, over a monitoring time duration that is subsequent to the time duration, monitored data comprising monitored output power values of the electrical generation system and monitored associated environmental data for the electrical generation system;

determining, based on the regression model and the monitored associated environmental data, predicted inverter output power values of the electrical generation system corresponding to the monitored associated environmental data;

identifying an output power discrepancy based on comparing the predicted output power values to the monitored output power values; and providing a notification of an anomaly based on identification of the output power discrepancy.

26. The computer program product of claim 25, wherein the electrical generation system comprises a photovoltaic electrical generation system, and the computer readable program code further comprising instructions for:

determining that a spatial variation of solar irradiance across an area of solar panels providing energy to the electrical generation system exceeds a threshold during a first period, and wherein the instructions for creating the selected set of data further comprise instructions for removing the output power values that are measured during the first period.

27. The computer program product of claim 25, wherein the at least one statistical relationship comprises:

a mean value of the set of output power values for each value of associated environmental data values; and a variance value of the set of output power values for each value of associated environmental data values, wherein the variance value comprises a standard deviation of the output power values, and wherein the instructions for determining the outlying data comprise instructions for determining data that differs by 2.5 times the standard deviation.

* * * * *